J. F. REILLY.
CABLE CARRIER.
APPLICATION FILED FEB. 6, 1922.

1,429,631.

Patented Sept. 19, 1922.
2 SHEETS—SHEET 1.

Inventor:
James F. Reilly,
By Jas. C. Wobensmith
Attorney.

J. F. REILLY.
CABLE CARRIER.
APPLICATION FILED FEB. 6, 1922.

1,429,631. Patented Sept. 19, 1922.
2 SHEETS—SHEET 2.

Inventor:
James F Reilly,
By Jas. C. Wobensmith
Attorney.

Patented Sept. 19, 1922.

1,429,631

UNITED STATES PATENT OFFICE.

JAMES F. REILLY, OF PHILADELPHIA, PENNSYLVANIA.

CABLE CARRIER.

Application filed February 6, 1922. Serial No. 534,365.

*To all whom it may concern:*

Be it known that I, JAMES F. REILLY, a citizen of the United States, residing at Philadelphia, in the county of Philadelphia and State of Pennsylvania, have invented certain new and useful Improvements in Cable Carriers, of which the following is a specification.

My invention relates to a cable carrier, that is to say, to a device, which is particularly adaptable for use in connection with cable operated railways, for the purpose of supporting the operating cable at various points between the extremities of the rail to prevent said cable from unduly sagging. More specifically considered, my invention relates to a device adapted to support the operating cables of overhead trolley systems which are adapted to transport materials from place to place by means of a trolley or carriage suspended from an overhead trackway such, for example, as the lower flange of an I beam, the cable supporting device being so constructed and arranged as to be readily pushed aside by the trolley or carriage as the same passes along the trackway, but which is adapted to be automatically returned to its normal operative position after the trolley or carriage has passed beyond the location of the supporting device, and which is so constructed and arranged as to be readily attached to the trackway and supported therefrom at any desired location.

The object, therefore, of my invention is to provide a simple and efficient device adapted to support the operating cable of cable operated trolley systems, which device is so constructed and arranged as to be pushed aside by the trolley or carriage as the same passes the location of the device, but which is adapted to be automatically returned to its normal position to again support the cable after the trolley has passed beyond the supporting device, and which further is so constructed and arranged as to be readily mountable at any desired location with respect to the trackway without requiring independent supporting means.

The nature and characteristic features of my invention will be more readily understood from the following description, taken in connection with the accompanying drawings forming part hereof, in which Figure 1 is an elevational view, taken transversely to the longitudinal extension of the cable and trackway, of a cable supporting device embodying the main features of my present invention;

Figures 1, 2:
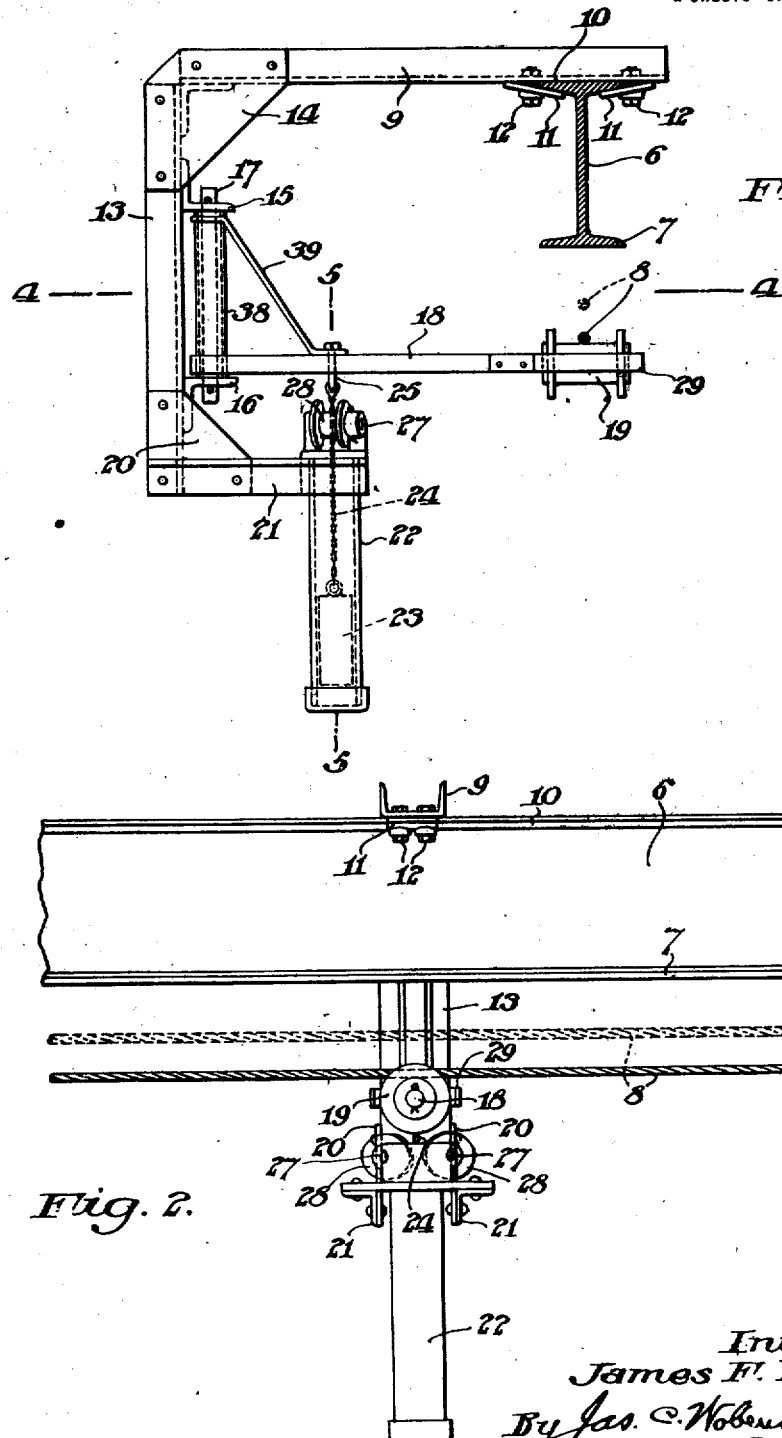
Fig. 2 is a front elevation thereof.
Figure 3:
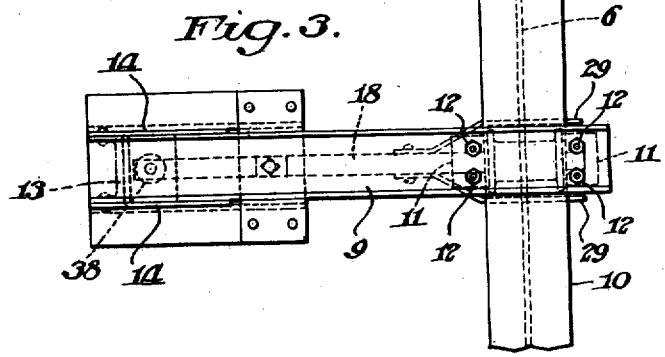
Fig. 3 is a top or plan view thereof.

Referring to the drawings, in which a preferred form or embodiment of my invention is shown, 6 is an I beam, the lower flange 7 of which constitutes a trackway upon which a trolley or carriage, not shown, but of any preferred construction, is adapted to travel, this I beam being supported by means of any suitable type of framework or supporting structure, depending upon the particular purpose for which the trackway is used. The operating cable 8 of the trolley system is normally disposed beneath the trackway, and is adapted to actuate the trolley or carriage which travels upon said trackway.

A beam 9, constituting one of the members of the framework of the cable supporting device, is attached at any desired location to the I beam 6, preferably to the upper flange 10 thereof. The preferred means of attachment comprises clamping plates 11 which are secured by bolts 12 in such manner as to clamp the flange 10 of the I beam 6 between the plates 11 and the under surface of one end of the beam 9. To the other end of the beam 9 there is preferably secured a vertical, downwardly extending member 13 secured to the beam 9 by suitable bracket plates 14.

The vertical member 13 has secured thereto brackets 15 and 16 in which a vertical rod 17 is mounted, the rod 17 forming a means for pivotally supporting a swinging arm 18.

For the purpose of affording sufficient horizontal rigidity to the free end of the arm 18, the brackets 15 and 16 are located some distance apart, and a cylindrical spacer 38 is placed around the pivot rod 17, extending upward from the pivotal end of the swinging arm 18 and bearing at its upper end against one end of a brace bar 39 which is also pivotally mounted on the rod 17 at that end, but which extends to and is bolted at its other end to the swinging arm 18 to thereby act as a brace or support to maintain the swinging arm 18 in a horizontal position at all times. The swinging arm 18 has journalled on the outer end thereof a spool shaped sheave 19 which is adapted to normally support the operating cable 8 at times when the trolley or carriage which is operated by said cable is not in proximity thereto.

The lower end of the vertical member 13 has secured thereto, by means of bracket plates 20, inwardly extending arms 21 which serve to support a hollow cylinder 22, within which a weight 23 is mounted, and which is adapted to rise and fall therein. The upper end of the weight 23 has secured thereto one end of a chain or cable 24, the other end of which is secured to an eye bolt 25 which is carried by the swinging arm 18 at a point some distance from the pivotal axis thereof. The supporting arms 21 which carry the cylinder 22 also serve to support brackets 26 within which are mounted stud shafts 27, and upon each of said stud shafts 27 there is journalled a pulley 28, one of these pulleys being provided on each side of the chain or cable 24, being adapted to provide a means for guiding said chain or cable 24 when the swinging arm 18 is moved out of its operative position to the one side or the other, as the case may be.

Figure 4:
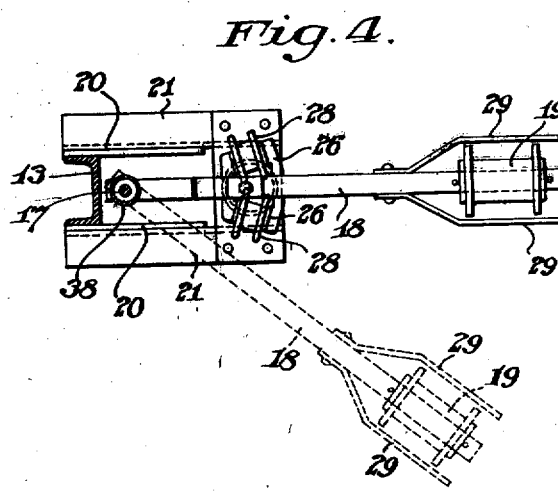
Fig. 4 is a horizontal section thereof taken approximately on the line 4—4 of Fig. 1.
Figure 5:
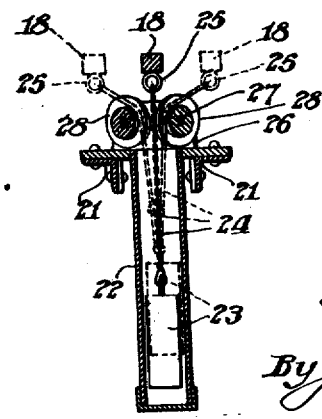
Fig. 5 is a vertical section taken approximately on the line 5—5 of Fig. 1, illustrating certain details of the internal construction and operation of certain of the parts.

On each side of the spool shaped sheave 19 there is mounted a guard bar 29 which is secured to and carried by the swinging arm 18, as clearly shown in Fig. 4 of the drawings. The purpose of this guard bar 29 is to prevent the trolley or carriage from abutting against the sheave 19 when the same passes the location of the cable supporting device above described.

The operation of the device will now be readily understood. The operating cable or cables of the cable operated tram ways normally rest upon and are supported by the spool shaped sheave 19 which, as before stated, is journalled on the outer free end of the swinging arm 18, and which thereby serves to prevent the same from abnormally sagging below the trackway comprising, in the present instance, the lower flange 7 of the I beam 6, the normal position of the cable being indicated in full lines in Figs. 1 and 2 of the drawings. When, however, the trolley or carriage approaches the location of the cable supporting device, the cable being attached to or extending into the trolley or carriage at a point some distance above the location of the sheave 19, the cable will be raised to a position as indicated in dotted lines in Figs. 1 and 2 of the drawings. When the trolley or carriage approaches still closer to the cable supporting device, one end of the same will encounter one or the other of the guard members 29, depending upon which side thereof the trolley or carriage approaches from, and as the trolley or carriage continues to travel along the trackway the swinging arm 18 will be pushed aside by the same.

When the swinging arm 18 is pushed aside the chain or cable 24 will be pulled over one or the other of the guide pulleys 28, and, as the swinging action continues, the weight 23 will be lifted within the cylinder 22 until, as the trolley or carriage passes beyond the end of the swinging arm, the same will then be free to return to its normal position, and will do so by reason of the pull of the weight 23 upon the chain or cable 24 which, as before stated, has its upper end connected to the swinging arm 18, whereupon, after the swinging arm 18 returns to its normal position, and as the trolley or carriage continues to pass to a point some distance beyond the same, the cable 8 will again be permitted to sag sufficiently to rest upon the sheave 19.

It will be seen that there is thus provided a simple and efficient device for supporting the operating cables of cable operated tramways which is so constructed and arranged whereby the same may be readily mounted upon existing trackways at any desired location without requiring special supporting framework, which device is entirely automatic in its action, is extremely simple and relatively inexpensive, and which is not likely to be easily deranged or damaged in its operation.

Having thus described the nature and characteristic features of my invention, what I claim as new and desire to secure by Letters Patent is:

1. A device for supporting the cable of a cable operated railway comprising a supporting framework, a swinging arm supported by said framework, means carried by said swinging arm adapted to support the cable, and means for maintaining said swinging arm in its normal operative position and for returning the same thereto, said means including a cable having one end connected to said swinging arm at a point some distance from the pivotal axis thereof, and means for maintaining tension on said cable.

2. A device for supporting the cable of a cable operated railway comprising a supporting framework, a swinging arm supported by said framework, means carried by said swinging arm adapted to support the cable, and means for maintaining said swinging arm it its normal operative position and for returning the same thereto, said means including a cable having one end connected to said swinging arm at a point some distance from the pivotal axis thereof, and a weight secured to the other end of said cable.

3. A device for supporting the cable of a cable operated railway comprising a supporting framework, a swinging arm supported by said framework, means carried by said swinging arm adapted to support the cable, and means for maintaining said swinging arm in its normal operative position and for returning the same thereto, said means comprising a cable having one end connected to said swinging arm at a point some distance from the pivotal axis thereof, a weight secured to the other end of said cable, and means adapted to guide said cable to which said weight is attached when the swinging arm is moved out of its normal operative position.

4. A device for supporting the cable of a cable operated railway comprising a supporting framework, a swinging arm supported by said framework, means carried by said swinging arm adapted to support the cable, and means for maintaining said swinging arm in its normal operative position and for returning the same thereto, said means comprising a cable having one end connected to said swinging arm at a point some distance from the pivotal axis thereof, a weight secured to the other end of said cable, and pulleys adapted to guide said cable to which said weight is attached when the swinging arm is moved out of its normal operative position.

5. A device for supporting the cable of a cable operated railway comprising a supporting framework, a swinging arm supported by said framework, a sheave mounted on the end of said swinging arm adapted to support the cable, and means for maintaining said swinging arm in its normal operative position and for returning the same thereto, said means including a cable having one end connected to said swinging arm at a point some distance from the pivotal axis thereof, and a weight secured to the other end of said cable.

6. A device for supporting the cable of a cable operated railway comprising a framework adapted to be directly attached to the track member of said railway, a swinging arm supported by said framework, a sheave mounted on the end of said swinging arm adapted to support the cable, and means for maintaining said swinging arm in its normal operative position and for returning the same thereto, said means including a cable having one end connected to said swinging arm at a point some distance from the pivotal axis thereof, and a weight secured to the other end of said cable.

7. A device for supporting the cable of a cable operated railway comprising a supporting framework, a swinging arm supported by said framework, a sheave mounted on the end of said swinging arm adapted to support the cable, and means for maintaining said swinging arm in its normal operative position and for returning the same thereto, said means comprising a cable having one end connected to said swinging arm at a point some distance from the pivotal axis thereof, a weight secured to the other end of said cable, and means adapted to guide said cable to which said weight is attached when the swinging arm is moved out of its normal operative position.

8. A device for supporting the cable of a cable operated railway comprising a framework adapted to be directly attached to the track member of said railway, a swinging arm supported by said framework, a sheave mounted on the end of said swinging arm adapted to support the cable, and means for maintaining said swinging arm in its normal operative position and for returning the same thereto, said means comprising a cable having one end connected to said swinging arm at a point some distance from the pivotal axis thereof, a weight secured to the other end of said cable, and means adapted to guide said cable to which said weight is attached when the swinging arm is moved out of its normal operative position.

9. A device for supporting the cable of a cable operated railway comprising a supporting framework, a swinging arm supported by said framework, a sheave mounted on the end of said swinging arm adapted to support the cable, and means for maintaining said swinging arm in its normal operative position and for returning the same thereto, said means comprising a cable having one end connected to said swinging arm at a point some distance from the pivotal axis thereof, a weight secured to the other end of said cable, and pulleys adapted to guide said cable to which said weight is attached when the swinging arm is moved out of its normal operative position.

10. A device for supporting the cable of a cable operated railway comprising a framework adapted to be directly attached to the track member of said railway, a swinging arm supported by said framework, a sheave mounted on the end of said swinging arm adapted to support the cable, and means for maintaining said swinging arm in its normal operative position and for returning the same thereto, said means comprising a cable having one end connected to said swinging arm at a point some distance from the pivotal axis thereof, a weight secured to the other end of said cable, and pulleys adapted to guide said cable to which said weight is attached when the swinging arm is moved out of its normal operative position.

In testimony whereof, I have hereunto signed my name.

JAMES F. REILLY.